Patented Mar. 1, 1949

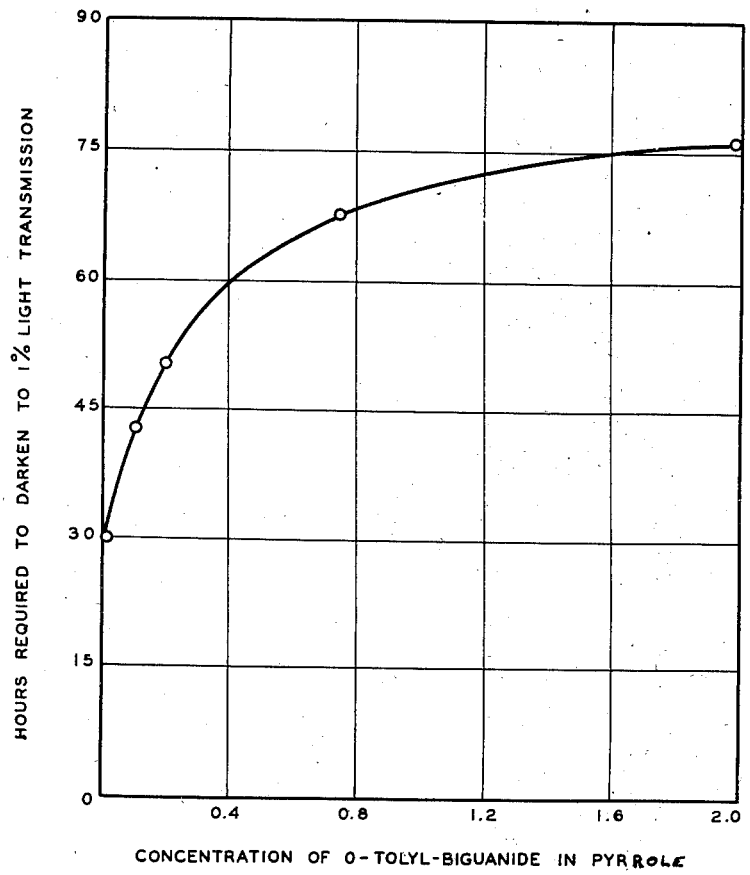

2,463,478

UNITED STATES PATENT OFFICE 2,463,478

STABILIZATION OF PYRROLE WITH A BIGUANIDE

Albert V. Cabal and Hollis G. Oliver, Woodbury, N. J., assignors to Socony-Vacuum Oil Company, Incorporated, a corporation of New York Application November 14, 1946, Serial No. 709,878

6 Claims. (Cl. 260—313)

This invention relates to the stabilization of pyrrole and, more particularly, is concerned with a method for inhibiting discoloration of pyrrole upon aging.

Normally, pyrrole is a colorless liquid. However, as is well known, it is characterized by a tendency to discolor upon exposure to light and air. Thus, when pyrrole is stored for any length of time or shipped over any considerable distance, it has been found to undergo considerable discoloration. This phenomenon has been particularly undesirable where a water-white product is desired and has necessitated removal of color bodies contained in the contaminated pyrrole by distillation thereof immediately prior to its use. The effect of distillation, however, is not permanent and the product shortly becomes discolored again upon further aging. The distillation of large quantities of pyrrole, moreover, is an expensive, time-consuming operation, requiring fractionating apparatus and involving the additional step of purification before the pyrrole can be employed for its intended use.

In accordance with the present invention, it has now been found that discoloration of pyrrole can be effectively inhibited over a substantial period of time by the addition thereto of a minor proportion of a biguanide. It has been discovered that pyrrole containing a small amount of a biguanide is considerably more stable towards discoloration than pyrrole in the absence of said additive. Thus, by use of the present invention, discoloration of pyrrole can be substantially inhibited or retarded to such an extent that distillation of the pyrrole, heretofore employed to remove color bodies therefrom, can be eliminated. Elimination of the distillation step, where considerable quantities of colorless pyrrole are needed, is highly desirable, leading, as a consequence thereof, to an effective saving in operational expenses and yielding an efficient, simple method of obtaining pyrrole uncontaminated by the presence of color bodies.

The present invention thus comprises a method for stabilizing the color of pyrrole by the addition thereto of a small proportion, sufficient to exert said stabilizing effect, of a biguanide having the general formula:

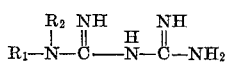

wherein $R_1$ represents hydrogen or a cyclic organic radical and $R_2$ represents hydrogen or an alkyl radical and salts of such biguanides.

Thus, the color stabilizers to be used herein must contain, as a nucleus, the group:

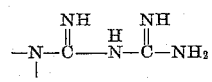

Generally, it is preferred to employ the biguanides wherein $R_1$ of the above general formula represents a cyclic organic radical and $R_2$ represents hydrogen. It is further preferred that the radical, represented by $R_1$, consists of carbon and hydrogen, and particularly preferable are those compounds wherein $R_1$ is an aromatic radical, especially an aryl radical of the benzene series. Representative of the biguanides contemplated for use in the present invention are phenyl methyl biguanide, butyl biguanide, decyl biguanide, xylyl biguanide, orthotolyl biguanide, para-tolyl biguanide, 2-naphthyl biguanide, orthobiphenyl biguanide, para-biphenyl biguanide, 4-hydroxyphenyl biguanide, 2-methoxyphenyl biguanide and 4-aminophenyl biguanide. The above list is not to be considered as limiting since it will be understood that other biguanides having the above general formula may likewise be employed as color stabilizers for pyrrole.

The amount of biguanide compound necessary for effecting color stabilization of pyrrole is dependent upon the degree to which the pyrrole can become discolored and still be employed for its intended purpose and also on the length of time during which effective discoloration of the pyrrole is desired. In general, as is to be expected, larger amounts of the biguanide are necessary to effect color stabilization of pyrrole over extended periods of time than in those instances where stabilization is desired only for a relatively short period of time. Usually, however, from about 0.01 per cent to about 2 per cent of biguanide, based on the weight of pyrrole, will be sufficient for most purposes in effecting color stabilization.

The biguanide stabilizer of the present invention appears to be particularly adaptable in inhibiting discoloration of pyrrole. Various other organic amines, such as aniline, di-secondary-butyl phenylene diamine and toluidines, which likewise are subject to discoloration upon aging, were found to be substantially unaffected by the stabilizers of the present invention. Thus, it may be postulated that the circumstances or causes leading to the discoloration of pyrrole differ from those which bring about discoloration of the other amines. The unique effect of biguanides in color-stabilizing pyrrole, as contrasted with other amines, may be due in part to the heterocyclic five-membered nitrogen-containing ring structure characteristic of pyrrole and lacking in other organic amines. However, the present invention is not to be unduly limited by any theory since it has been found that, despite the fact that biguanides have little or no effect in stabilizing the color of amines generally, they are effective as color stabilizers for pyrrole.

The method used for determining the degree of color stabiliization accorded to pyrrole by the addition thereto of small amounts of a biguanide was as follows: A number of freshly distilled water-white samples of pyrrole were placed in vessels immersed in an oil bath maintained at a temperature of 158° F. One of the samples was left blank. To each of the others were added varying quantities of orthotolyl biguanide. Folded filter papers were placed over each of the vessel openings to exclude extraneous material. At regular intervals the samples were removed from the bath and tested for color with a Lovibond instrument and also with a Lumetron colorimeter which measures by photoelectric means the percentage of a given light transmission through the sample being tested. A plot of color, expressed in terms of light transmission, versus time, indicated the rate of color degradation and the time required to degrade the color to a figure of 8 on the National Petroleum Association scale, which is equivalent to a 1 per cent transmission in the Lumetron colorimeter fitted with a North Sky filter. The following experimentally obtained results are representative of those which can be effected in accordance with the present invention:

| Biguanide | Concentration (Wt. percent of pyrrole) | Original Light Transmission percent | Hours Required to Darken to 1% Light Transmission |
|---|---|---|---|
| o-tolyl biguanide | 0 | 98.5 | 30 |
| Do | 0.1 | 95.1 | 43 |
| Do | 0.2 | 98.6 | 49.5 |
| Do | 0.75 | 98.3 | 68 |
| Do | 2.0 | 94.8 | 76 |

A graphical representation of these results is shown in the attached drawing. It will be noted, upon examination of this curve, that the color stabilization of pyrrole is greatly increased by the presence of small amounts of orthotolyl biguanide up to about 1 per cent by weight of this compound. Further additions of biguanide increase the stabilization only slightly and the curve tends to level off when the concentration of biguanide reaches about 2 per cent by weight, indicating that further additions would have little or no effect in improving the color stabilization of pyrrole under the conditions at which the tests were carried out.

It will be, of course, understood by those skilled in the art that the above described tests were effected under rather drastic conditions at a temperature higher than that ordinarily encountered under the usual conditions of storing or transporting pyrrole. Also, it will be noted that the times recorded represent the number of hours in which the color of pyrrole transgressed from a substantially colorless solution through which the original light transmission was almost 100 per cent to a solution through which the light transmission was only 1 per cent.

We claim:

1. A composition comprising pyrrole and a small proportion sufficient to effect color stabilization of said pyrrole of a mono-substituted biguanide in which the substituent is an aromatic radical of the benzene series consisting of carbon and hydrogen.

2. A composition comprising pyrrole and a small proportion sufficient to effect color stabilization of said pyrrole of a tolyl biguanide.

3. A composition comprising pyrrole and a small proportion sufficient to effect color stabilization of said pyrrole of orthotolyl biguanide.

4. A method for stabilizing the color of pyrrole, comprising the addition thereto of a mono-substituted biguanide in which the substituent is an aromatic radical of the benzene series consisting of carbon and hydrogen.

5. A method for stabilizing the color of pyrrole, comprising the addition thereto of a tolyl biguanide.

6. A method for stabilizing the color of pyrrole, comprising the addition thereto of orthotolyl biguanide.

ALBERT V. CABAL.
HOLLIS G. OLIVER.

REFERENCES CITED

The following references are of record in the file of this patent:

UNITED STATES PATENTS

| Number | Name | Date |
|---|---|---|
| 2,072,465 | Reppe et al. | Mar. 2, 1937 |
| 2,221,333 | Sibley | Nov. 12, 1940 |
| 2,414,407 | Freudenberg | Jan. 14, 1947 |